United States Patent [19]

Thomsen et al.

[11] Patent Number: 5,475,854
[45] Date of Patent: Dec. 12, 1995

[54] SERIAL BUS I/O SYSTEM AND METHOD FOR SERIALIZING INTERRUPT REQUESTS AND DMA REQUESTS IN A COMPUTER SYSTEM

[75] Inventors: Joseph A. Thomsen; Franklyn H. Story, both of Chandler; David R. Evoy, Tempe; W. Henry Potts, Phoenix; Brian N. Fall, Chandler; Hrushikesh Nalubola, Tempe, all of Ariz.

[73] Assignee: VLSI Technology, Inc., San Jose, Calif.

[21] Appl. No.: 187,960

[22] Filed: Jan. 28, 1994

[51] Int. Cl.[6] .................................................. G06F 13/14
[52] U.S. Cl. .......................... 395/800; 395/733; 395/842; 364/DIG. 1; 364/242.31; 364/242.3; 364/242.96
[58] Field of Search ..................................... 395/800, 700, 395/500, 200, 275, 425, 725, 733, 842; 340/825.52

[56] References Cited

U.S. PATENT DOCUMENTS

| | | | |
|---|---|---|---|
| 4,358,825 | 11/1982 | Kyu et al. | 395/325 |
| 5,142,628 | 8/1992 | Okochi et al. | 395/325 |
| 5,305,441 | 4/1994 | Okochi et al. | 395/325 |
| 5,390,350 | 2/1995 | Chung et al. | 395/150 |
| 5,404,460 | 4/1995 | Thomsen et al. | 395/275 |

Primary Examiner—Mehmet Geckil
Attorney, Agent, or Firm—Harry M. Weiss & Associates

[57] ABSTRACT

A serial bus Input/Output (I/O) system has multiple I/O devices which are all connected in daisy-chain fashion on a serial bus. These I/O devices service peripherals that may generate different interrupt requests or DMA requests to the system controller. These requests are encoded, serialized and transmitted to the system controller on the serial bus, allowing the system controller to service a large number of interrupt requests and DMA requests via the serial bus with a very small number of external pins.

10 Claims, 3 Drawing Sheets

SERIAL BUS I/O SYSTEM AND METHOD FOR SERIALIZING INTERRUPT REQUESTS AND DMA REQUESTS IN A COMPUTER SYSTEM

RELATED APPLICATION

This patent application is related to the patent application entitled "METHOD FOR CONFIGURING MULTIPLE IDENTICAL SERIAL I/O DEVICES TO UNIQUE ADDRESSES THROUGH A SERIAL BUS", filed Feb. 22, 1994, now U.S. Pat. No. 5,404,460 and assigned to the same assignee, and is incorporated herein by reference.

BACKGROUND OF THE INVENTION

1. Field of the Invention

This invention generally relates to electronic Input/Output (I/O) systems and methods, and, more specifically, relates to a serial bus I/O system and method for serializing interrupt requests and DMA requests in a computer system.

2. Description of the Related Art

The trend in electronic systems is towards miniaturization, as shown by the success in the marketplace of laptop and notebook computers, and hand-held video games such as the Nintendo Game Boy. As the size of these systems shrinks, the pin count on their components becomes a significant limiting factor in further decreasing the size of the end product. Many systems are conserving pins by taking certain functions that used to occur in parallel format, and implementing these functions instead in a serial format. Electronic systems that have components that communicate via a serial bus are well-known in the prior art. In this manner a parallel data transfer that used to take eight data bits and a control bit for handshaking (nine bits total) can be implemented in serial format, which requires only two pins, one for serial data and another for the control bit.

One specific example of reducing pin count by serializing functions previously accomplished in parallel is found in the VL82C480 chipset by VLSI. To minimize the number of pins required to support a traditional ISA bus, the VL82C480 put the DMA Request (DRQ) and Interrupt Request (IRQ) inputs that service the ISA bus into a parallel to serial converter, and used the resulting serial stream to determine the state of the DRQ and IRQ inputs. This serial stream had a dedicated bit for each DRQ and IRQ input, making for a large serial packet. This serialization of DRQs and IRQs introduces latency to these signals due to the time required to serialize the data, the time required to shift out this large serial packet, and the time required to convert this serial data back to parallel format. For the case of a DMA Request, excessive latency could result in the DRQ input being asserted after the service of the DMA is no longer required, resulting in overflowing or underflowing the DMA data transfer. For the case of an Interrupt Request, excessive latency could cause the IRQ input to be asserted when an interrupt is no longer present, resulting in the CPU servicing the Interrupt Request needlessly. For these reasons the latency of the serial stream is critical and must be minimized.

Therefore, there existed a need to provide a serial bus I/O system and method for serializing interrupt requests and DMA requests and which provides minimum latency for the signals on the serial bus.

SUMMARY OF THE INVENTION

According to one embodiment of the present invention, a system controller, peripheral controller, and several I/O devices are all coupled together in a daisy-chain arrangement on a serial bus. This daisy-chain arrangement implies that the serial data output of one device is connected to the serial data input of the following device. Upon power-up or system reset, the I/O devices are each configured with a unique address to identify each I/O device to the System Controller. The configuration of each I/O device to a unique address is explained in the Related Application referenced above.

Once the I/O devices have been configured with a unique address, the system is ready for operation. The peripherals coupled to each I/O device may require interrupt service or DMA service from the System Controller. When the peripheral coupled to the I/O device needs either DMA or interrupt service from the System Controller, the I/O device transmits a packet on the serial bus indicating the service required. The System Controller decodes this packet and provides the appropriate interrupt or DMA service as required.

The foregoing and other features and advantages will be apparent from the following description of the preferred exemplary embodiment of the invention as illustrated in the accompanying drawings.

BRIEF DESCRIPTION OF THE DRAWING

The preferred exemplary embodiment of the present invention will hereinafter be described in conjunction with the appended drawing, wherein like designations denote like elements, and.

DETAILED DESCRIPTION OF THE PREFERRED EXEMPLARY EMBODIMENT

Figure 1:
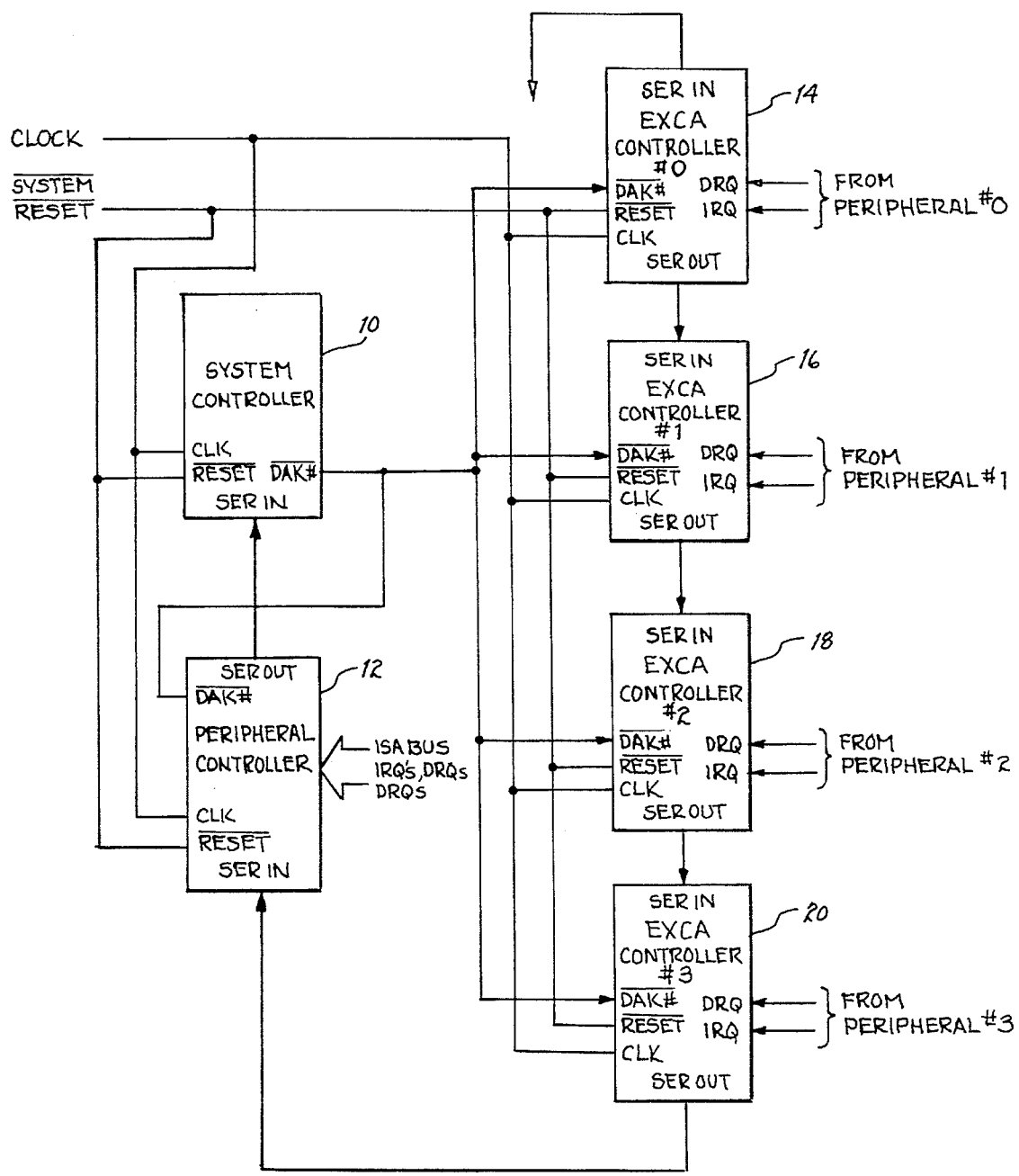
FIG. 1 is a block diagram schematic of a serial bus I/O system in accordance with the preferred exemplary embodiment of the present invention.

As shown in FIG. 1, the preferred exemplary embodiment in accordance with the present invention comprises a System Controller 10, a Peripheral Controller 12, and four identical I/O devices 14, 16, 18 and 20 known as EXCA Controllers. Each of these devices 10, 12, 14, 16, 18, and 20 have a clock input which is connected to a common Clock source, and have a reset input which are connected to a common System Reset signal. The configuration shown in FIG. 1 is used in an IBM-compatible notebook computer system. System Controller 10 corresponds to the CPU chipset, which includes an internal Interrupt Controller (not shown) and an internal DMA Controller (not shown); EXCA Controllers 14, 16, 18 and 20 are expansion slots for peripherals such as Random Access Memory (RAM), a MODEM, serial and parallel communication ports, etc.; and Peripheral Controller 12 is used to encode Interrupt Request (IRQ) and DMA Request (DRQ) information relating to the ISA bus, and to pass along serial data from EXCA Controllers 14, 16, 18 and 20 to System Controller 10.

FIG. 1 shows that the Serial In input to EXCA Controller #0 (14) is held to a constant low logic state, and that the Serial Out output of EXCA Controller #0 (14) is connected to the Serial In input of EXCA Controller #1 (16). Likewise, the Serial Out output of EXCA Controller #1 (16) is connected to the Serial In input of EXCA Controller #2 (18), and the Serial Out output of EXCA Controller #2 (18) is connected to the Serial In input of EXCA Controller #3 (20). The Serial Out output of EXCA Controller #3 (20) is connected to the Serial In input of Peripheral Controller 12, and the Serial Out output of Peripheral Controller 12 is connected to the Serial In input of System Controller 10. These daisy-chain connections from one device to the next comprise the serial bus.

The serial bus interconnects the devices of FIG. 1 as shown, providing a data path for EXCA Controllers 14, 16, 18 and 20, and Peripheral Controller 12, to communicate with System Controller 10. In a typical notebook computer application, this serial bus provides a low pin count solution for providing programmable interrupt requests (IRQ) and DMA requests (DRQ) for the peripherals coupled to EXCA Controllers 14, 16, 18 and 20. The serial bus also allows the interrupts and DMA requests from other ISA bus peripherals to be located remotely from the DMA controller and interrupt controller within System Controller 10, by coupling the IRQ and DRQ lines from the ISA Bus to Peripheral Controller 12 as shown.

The serial bus encodes SMI, IRQ, and DRQ information in a six bit packet and transmits this information serially to Peripheral Controller 12. The serial bus protocol provides for daisy chaining multiple interrupt request and DMA request sources together on a single serial stream, further minimizing the pin overhead for IRQ and DRQ support. This scheme allows multiple I/O devices to use the same IRQ level or DRQ level without these sources directly driving the same IRQ or DRQ signals.

The serial bus uses defined packets to transfer data. Each packet contains six bits of information that is equivalent to one signal in a typical ISA bus implementation. The packet can be either an interrupt request (IRQ), a DMA request (DRQ), an SMI request, or an EXCA Controller number, as shown in the table below.

| Bit # | Bit Name | Description |
| --- | --- | --- |
| 0 | Start Bit | Serial Data Output is driven low to signify the beginning of packet transmission |
| 2–1 | Packet Type | 00: EXCA Controller ID packet<br>01: SMI Request Packet<br>10: INT Request Packet<br>11: DMA Request Packet |
| 6–3 | Packet ID | For IRQ, SMI or ID types this is a binary representation of the requester or ID number. For DRQ types, bits 5–3 are a binary representation of the requestor and bit 6 is zero. |
| 7 | Stop Bit (optional) | If no more packets are queued to be transmitted, the Serial Out output will be driven to a logic 1. Otherwise, this bit will be replaced by the start bit of the next packet. |

The first bit is a Start Bit, the next two bits are a Packet Type field which identifies the type of data being sent, and the four remaining bits are Packet ID, identifying the packet. Note that an optional Stop Bit is also included if the serial data bus is idle following the packet.

The serial bus is a synchronous serial bus, with all packets transmitted synchronously to the Clock input. Data changes on the rising edge of Clock. Each device 12, 14, 16, 18 and 20 on the serial bus samples data presented to its Serial In input on the falling edge of Clock, and resynchronizes the incoming data stream before passing it on. This introduces one clock of latency for each I/O device on the serial bus, but guarantees that the data stream will always be synchronous to Clock, regardless of the number of devices on the serial bus.

Clock can be provided from an external source as shown in FIG. 1, or may be generated in one of the serial bus devices and connected to the remaining devices. Clock is typically a 25 MHz square wave in this particular example, but there is no minimum clock frequency requirement. Clock can be any frequency providing the latency on the serial bus is not so great that reliable system operation is impaired.

The arbitration algorithm for the serial bus is very simple. The higher the I/O device's position in the daisy chain, the higher its priority. This is possible due to the requirement that Start Bits for each I/O device are always a modulo 7 number of clock cycles apart. This allows each device on the serial bus to determine when it is allowed to start transmission of a packet. Since the higher priority devices are placed higher in the chain, they will keep the serial bus busy when they require service, effectively locking out lower priority devices which are lower down the chain until the serial bus goes inactive. Since a stop bit only occurs if there is no packet immediately following the current packet, a stop bit signals the I/O device receiving it that the serial bus is available for it to transmit a packet, if needed. Given the one clock cycle latency for each I/O device caused by resynchronizing incoming data to Clock, an I/O device can sense a stop bit, and begin transmitting its packet on the very next clock cycle.

To assure that the I/O devices remain synchronized to Clock, each I/O device counts the number of successive one's received on its Serial In input. When the count of ones exceeds six, the I/O device knows than an empty packet has just occurred, and the I/O device will synchronize itself to the next zero bit since it is, by definition, a start bit.

Figure 2:
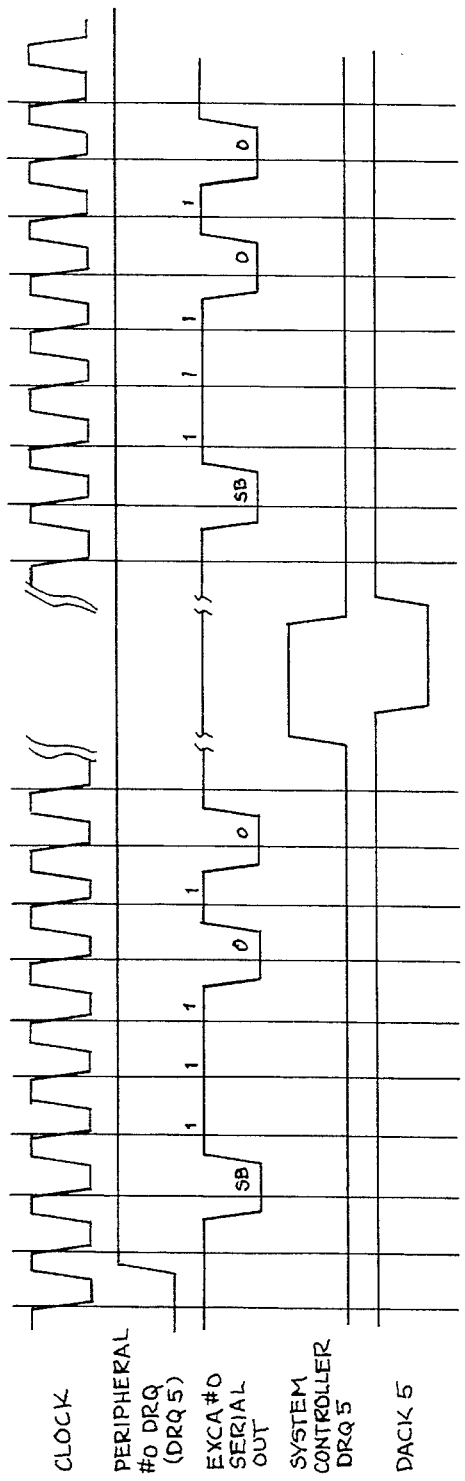
FIG. 2 is a timing diagram showing the timing sequence for serializing a DMA Request for the system of FIG. 1.
Figure 3:
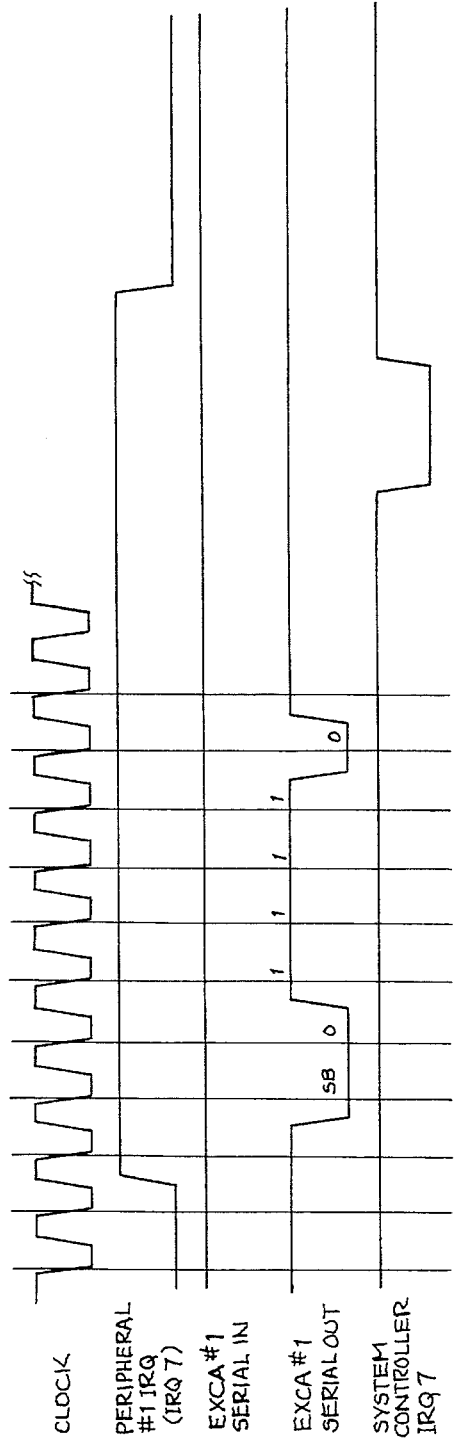
FIG. 3 is a timing diagram showing the timing sequence for serializing an Interrupt Request for the system of FIG. 1.
Figure 4:
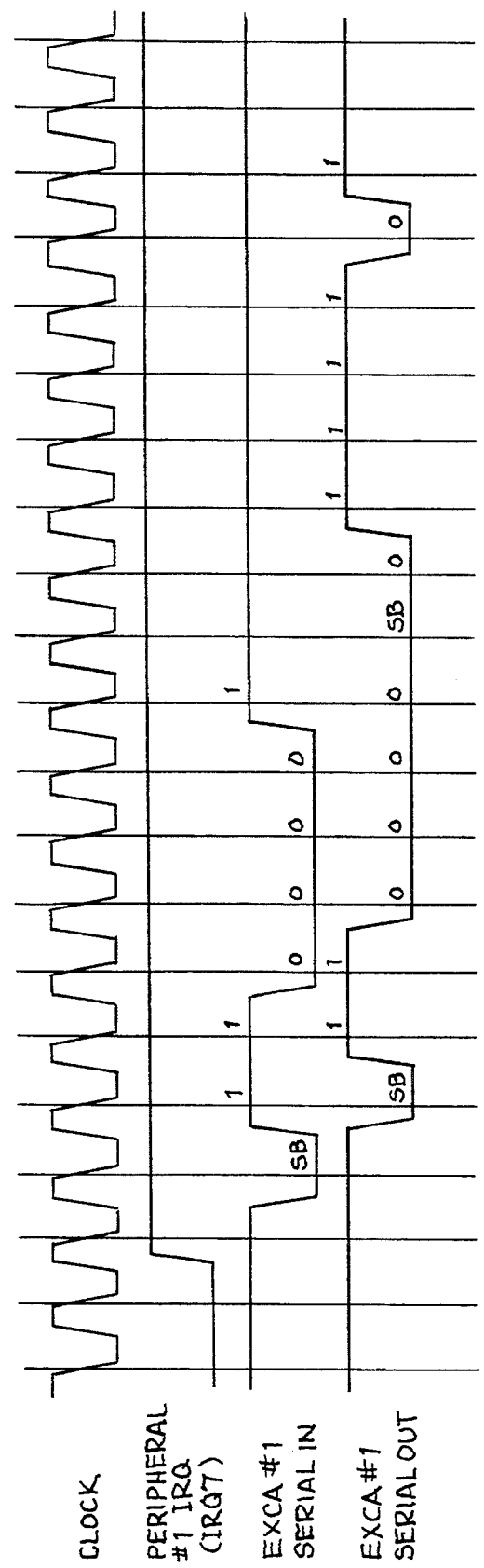
FIG. 4 is a timing diagram showing the timing sequence for serializing an Interrupt Request for the system of FIG. 1 when the serial bus is busy with a DMA Request.

The operation of the system of FIG. 1 is shown by the timing diagrams of FIGS. 2–4. The serial bus can be used to transfer information regarding interrupt requests (including IRQ and SMI requests) and DMA requests from each EXCA Controller, as well as configuring the EXCA Controllers 14, 16, 18 and 20 to their respective assigned address spaces. The present invention relates to the serialization of IRQ, SMI and DRQ signals.

An EXCA Controller transmits Packet Type 01 when it requires SMI service from System Controller 10, transmits Packet Type 10 when it requires Interrupt Request service from System Controller 10, and transmits a Packet Type 11 when it requires service from the DMA Controller within System Controller 10. Packet type 00, which is used to configure the EXCA Controllers 14, 16, 18 and 20 upon system reset or power-up, is not germane to the present invention, but is shown for completeness. The operation of the system as shown in FIGS. 2–4 assumes that the system has been reset, and that the EXCA Controllers 14, 16, 18 and 20 have all been configured to their unique address spaces.

The timing of the serialization of a typical DMA Request for the system of FIG. 1 is shown in FIG. 2. This particular example assumes that Peripheral #0, which is coupled to EXCA Controller #0 (14) (see FIG. 1), requires service from DRQ5 when Peripheral #0 asserts the DRQ input of EXCA Controller #0 (14). When Peripheral #0 asserts the DRQ signal to EXCA Controller #0 (14), EXCA Controller #0 (14) outputs a serial packet on its Serial Out output that has a Packet Type of 11 (indicating a DMA Request Packet) and a Packet ID of 0101 (indicating that DRQ5 requires service). After this packet travels through EXCA Controllers 16, 18 and 20, and through Peripheral Controller 12, it reaches System Controller 10, which decodes the packet and asserts the DRQ5 signal to its internal DMA Controller (not shown).

The DMA Controller within System Controller 10 acknowledges the assertion of DRQ5 by asserting a DAK5 signal. The DAK# input to each EXCA Controller 14, 16, 18 and 20 are internally ANDed with the DRQ input for each EXCA Controller, and the EXCA Controller #0 (14) will thus generate a DMA Request Packet each time it sees a low to high transition on the output of this AND gate. In this manner, if DAK5 is high as shown in FIG. 2 when Peripheral #0 DRQ is asserted, the output of the internal AND gate within EXCA Controller #0 (14) goes from low to high, and EXCA Controller #0 (14) therefore generates a DMA Request Packet. This scheme results in a DMA Request Packet being generated when DRQ goes active when DAK is already high, or when DAK goes inactive with DRQ still active. This causes demand mode DMA devices to essentially issue multiple DMA requests instead of issuing one long, continuous request. System Controller 10 asserts the appropriate DRQ lines to its internal DMA controller (not shown) whenever a DMA Request Packet is received, and negates it when the appropriate DAK# is generated. Since the four bits of data within the DMA Request Packet provide for sixteen levels of DRQs, but the system of FIG. 1 typically only has eight levels of DRQs, the most significant bit of the Packet ID field is always zero for a DMA Request Packet.

The timing of the serialization of an Interrupt Request is shown in FIG. 3. Peripheral #1 is selected for this specific example, and it is assumed that Peripheral #1, which is coupled to EXCA Controller #1 (16), requires service from IRQ7 when Peripheral #1 asserts the IRQ input of EXCA Controller #1 (16). When Peripheral #1 asserts the IRQ signal to EXCA Controller #1 (16), EXCA Controller #1 (16) outputs a serial packet on its Serial Out output that has a Packet Type of 10 (indicating an IRQ Request Packet) and a Packet ID of 0111 (indicating that IRQ7 requires service). Note that EXCA Controller #1 (16) can only transmit this IRQ Request Packet when its Serial In input is idle. EXCA Controller #1 (16) knows the Serial In input is idle when this input shows a stop bit (is high) during one of the modulo 7 start times for EXCA Controller #1. In FIG. 3, the Serial In input of EXCA Controller #1 is always high, so EXCA Controller #1 can transmit the IRQ Request Packet immediately on the next packet, as soon as the modulo 7 start bit time occurs.

After this IRQ Request Packet travels through EXCA Controllers 18 and 20, and through Peripheral Controller 12, it reaches System Controller 10, which decodes the packet and asserts the IRQ7 signal to its internal Interrupt Controller (not shown).

An SMI Request Packet is handled in the exact same way as the Interrupt Request Packet just described, since an SMI is, in fact, a special type of interrupt. If FIG. 3 were modified so the IRQ label was replaced by an SMI label instead, this would accurately reflect the operation of the serial bus during an SMI Request Packet, as described above in relation to the IRQ Request Packet.

The operation of the data bus of FIG. 1 includes inherent latency in serializing and shifting the required data packets to System Controller 10. This latency can increase when different EXCA Controllers require use of the serial bus at the same time, as shown in FIG. 4. In this example, Peripheral #1 asserts the IRQ input to EXCA Controller #1, which corresponds to IRQ7. EXCA Controller #1 would like to send an IRQ Request Packet on the next modulo 7 start bit, but during the next start bit the Serial In input is active with a DRQ5 request from Peripheral #0. (11 in the Packet Type field identifies this packet as a DMA Request Packet, and 0101 in the Packet ID field identifies this DMA Request as DRQ5.) EXCA #1 must therefore wait until its Serial In input goes inactive by showing a stop bit. Once the stop bit is seen, EXCA #1 can output the Interrupt Request Packet on the very next packet, thereby minimizing latency.

The latency of the serial bus can impair system performance if it becomes too long. For this reason the IRQ and DRQ information is binarily encoded in the Packet Type field and the Packet ID field to reduce the number of bits required to communicate all the needed IRQ and DRQ signals. The maximum latency for a single packet in the system of FIG. 1 occurs for EXCA Controller #0 (14), and is calculated as follows:

7 clocks before the start bit location 7 clocks to transmit the packet 1 clock latency for each of the three other EXCA Controllers 16, 18, and 20

1 clock latency for the Peripheral Controller 12 This results in a total of 18 clock cycles of latency. At 25 MHz, the total latency is therefore 720 nanoseconds. If two packets occur simultaneously, the worst case latency is increased by seven additional clock cycles while the first packet is transmitted, resulting in a total latency of 25 clock cycles. At 25 MHz, the worst-case latency is therefore 1 microsecond. For each additional packet that occurs simultaneously, add an additional 250 nanoseconds of latency. Note that the prior art implementation of this type of serial bus found in the VL82C480 chipset had a packet wherein each IRQ and DRQ had a separate bit. The IBM PC-AT computer has sixteen different IRQ inputs, eight different DRQ inputs, and one SMI interrupt. So the prior art implementation of the VL82C480 chipset required a 26 bit serial bus packet since the data was not encoded. By encoding the data, this number is reduced from 26 bit packets to 7 bit packets, which greatly reduces the latency of the serial bus.

It is obvious from the description of the preferred embodiment above that this serial bus and method of serializing IRQ, DRQ, and SMI data can be accomplished with a number of different non-EXCA peripherals on the same serial bus and at various locations, allowing great system flexibility within the scope of the present invention.

While the invention has been described in its preferred exemplary embodiment, it is to be understood that the words which have been used are words of description rather than limitation, and that changes may be made within the purview of the appended claims without departing from the true scope and spirit of the invention in its broader aspects. For example, the EXCA Controllers described herein are shown for illustrative purposes only, and any type of suitable serial I/O device could be substituted for the EXCA Controllers within the scope of the present invention. It will be understood that, while various of the conductors (connections) are shown in the drawing as single lines, they are not so shown in a limiting sense, and may comprise plural conductor (connections), as is understood in the art.

What is claimed is:

1. A serial bus I/O system comprising, in combination:

A) a clock source;

B) system controller means for servicing DMA requests and interrupt requests in said serial bus I/O system comprising, in combination:
1) a serial input;
2) a clock input coupled to the clock source;
3) an internal DMA controller; and
4) an internal interrupt controller;

c) peripheral controller means for serializing at least one said interrupt requests and at least; one of said DMA requests, comprising, in combination:
1) a serial output coupled to said serial input of said system controller means;
2) a serial input;
3) a clock input coupled to the clock source;
4) an interrupt request input coupled to a first peripheral;
5) a DMA request input coupled to said first peripheral;
6) encoding means for encoding system management interrupt (SMI) information, interrupt request information, and DMA request information in a six bit packet and for allowing said plurality of serial I/O devices to use at least one of a same. interrupt request level and a DMA request level without directly driving said same interrupt request and said DMA request signals;
7) means for synchronizing and transferring said six bit packet from the serial input of said peripheral controller means to the serial output of said peripheral controller means with a one clock cycle delay on said clock source;
8) means for transmitting a first serial packet on said serial output of said peripheral controller means to said internal interrupt controller within said system controller means when said first peripheral activates said interrupt request input of said peripheral controller means; and
9) means for transmitting a second serial packet on said serial output of said peripheral controller means to said internal DMA controller within said system controller means when said first peripheral activates said DMA request input of said peripheral controller means;

D) a plurality of serial I/O devices each comprising, in combination:
1) a serial input;
2) a serial output;
3) a clock input coupled to the clock source;
4) an interrupt request input coupled to a second peripheral;
5) a DMA request input coupled to said second peripheral;
6) encoding means for encoding system management interrupt (SMI) information, interrupt request information, and DMA request information in a six bit packet and for allowing said plurality of serial I/O devices to use at least one of a same interrupt request level and a DMA request level without directly driving said same interrupt request and said DMA request signals;
7) means for synchronizing and transferring said six bit packet from the serial input of said serial I/O device to the serial output of said serial I/O device with a one clock cycle delay on said clock source;
8) means for transmitting a third serial packet on said serial output of said serial I/O device to said internal interrupt controller within said system controller means when said second peripheral activates said interrupt request input of said serial I/O device; and
9) means for transmitting a fourth serial packet on said serial output of said serial I/O device to said internal DMA controller within said system controller means when said second peripheral activates said DMA request input of said serial I/O device;

E) said plurality of serial I/O devices being coupled to each other in a sequential order by coupling the serial input of a first of said plurality of serial I/o devices to a constant logic state, and by coupling the serial output of each of said plurality of serial I/O devices to the serial input of the next of said plurality of serial I/O devices in said sequential order, and by coupling the serial output of the last of said plurality of serial I/O devices to said serial input of said peripheral controller means.

2. The serial bus I/O system of claim 1 wherein said means for synchronizing and transferring data comprising dynamic resynchronizing means for synchronizing said serial I/O device to said clock source when said serial input of said serial I/O device is inactive for a predetermined number of clock cycles.

3. The serial bus I/O system of claim 1 wherein the predetermined number of clock cycles being six.

4. The serial bus I/O system of claim 1 wherein said serial packets being encoded to minimize the number of required bits.

5. The serial bus I/O system of claim 1 wherein said plurality of serial I/O devices each having DMA acknowledge input means for determining when the internal DMA controller within said system controller means has acknowledged a DMA request from one of said plurality of serial I/O devices.

6. A method for serializing interrupt requests and DMA requests in a computer system including the steps of:
providing a clock source;
providing system controller means for servicing said interrupt requests and said DMA requests comprising, in combination:
1) a serial input;
2) a clock input coupled to said clock source;
3) an internal DMA controller; and
4) an internal interrupt controller;

providing peripheral controller means for serializing at least one of said interrupt requests and said DMA requests comprising, in combination:
1) a serial output coupled to said serial input of said system controller means;
2) a serial input;
3) a clock input coupled to said clock source;
4) an interrupt request input;
5) a DMA request input;
6) encoding means for encoding system management interrupt (SMI) information, interrupt request information, and DMA request information in a six bit packet and for allowing said plurality of serial I/O devices to use at least one of a same interrupt request level and a DMA request level without directly driving said same interrupt request and said DMA request signals;
7) means for synchronizing and transferring said bit pack from the serial input of said peripheral controller means to the serial output of said peripheral controller means with a one clock cycle delay on said clock source;
8) means for transmitting a serial packet on said serial output of said peripheral controller means to said internal interrupt controller within said system Controller means; and 9 means for transmitting a serial packet on said serial output of said peripheral controller means to said internal DMA controller within said system controller means;

providing a plurality of serial I/O devices each comprising, in combination:
1) a serial input;
2) a serial output;
3) a clock input;
4) an interrupt request input;
5) a DMA request input:
6) encoding means for encoding system management interrupt (SMI) information, interrupt request information, and DMA request information in a six bit packet and for allowing said plurality of serial I/O devices to use a same interrupt request level and a DMA request level without directly driving said same interrupt request and said DMA request signals;
7) means for synchronizing and transferring said six bit packet from the serial input of said serial I/O device to the serial output of said serial I/O device with a one clock cycle delay on said clock source;
8) means for transmitting a serial packet on said serial output of said serial I/O device to said internal interrupt controller within said system controller means; and
9) means for transmitting a serial packet on said serial output of said serial I/O device to said internal DMA controller within said system controller means;

coupling said plurality of serial I/O devices to each other in a sequential order by coupling the serial input of a first of said plurality of serial I/O devices to a constant logic state, and by coupling the serial output of each of said plurality of serial i/o devices to the serial input of the next of said plurality of serial I/O devices in said sequential order, and by coupling the serial output of the last of said plurality of serial I/O devices to said serial input of said peripheral controller means:

coupling a plurality of peripherals to said interrupt request inputs and to said DMA request inputs of said plurality of serial I/O devices;

synchronizing and transferring data from the serial input of said peripheral controller means to the serial output of said peripheral controller means with a one clock cycle delay on said clock source;

transmitting said serial packet on said serial output of said peripheral controller means to said internal interrupt controller within said system controller means when one of said plurality of peripherals activates said interrupt request input of said peripheral controller means;

transmitting said serial packet on said serial output of said peripheral controller means to said internal DMA controller within said system controller means when one of said plurality of peripherals activates said DMA request input of said peripheral controller means;

synchronizing and transferring data from the serial input of each of said plurality of serial I/O devices to the serial output of the same serial I/o device with a one clock cycle delay on said clock source;

transmitting said serial packet on said serial output of each of said plurality of serial I/O devices to said internal interrupt controller within said system controller :means when one of said plurality of peripherals activates one of said interrupt request inputs of said plurality of serial I/o devices; and transmitting said serial packet on said serial output of each of said plurality of serial I/O devices to said internal DMA controller within said system controller means when one of said plurality of peripherals activates one of said DMA request inputs of said plurality of serial I/O devices.

7. The method of claim 6 further including the step of dynamically resynchronizing said I/O device to said clock source when said serial input of said I/O device is inactive for a predetermined number of clock cycles.

8. The method of claim 6 further including the step of encoding said serial packets to minimize the number of required bits, thereby minimizing latency.

9. The method of claim 6 further including the step of providing DMA acknowledge input means to said peripheral controller means for determining when the internal DMA controller within said system controller means has acknowledged a DMA request from said peripheral controller means.

10. The method of claim 6 further including the step of providing DMA acknowledge input means to each of said plurality of serial I/O devices for determining when the internal DMA controller within said system controller means has acknowledged a DMA request from one of said plurality of serial I/O devices.

* * * * *